F. S. ELLETT.
ENGINE STARTING DEVICE FOR MOTOR CYCLES.
APPLICATION FILED APR. 27, 1914.
1,141,787.  Patented June 1, 1915.
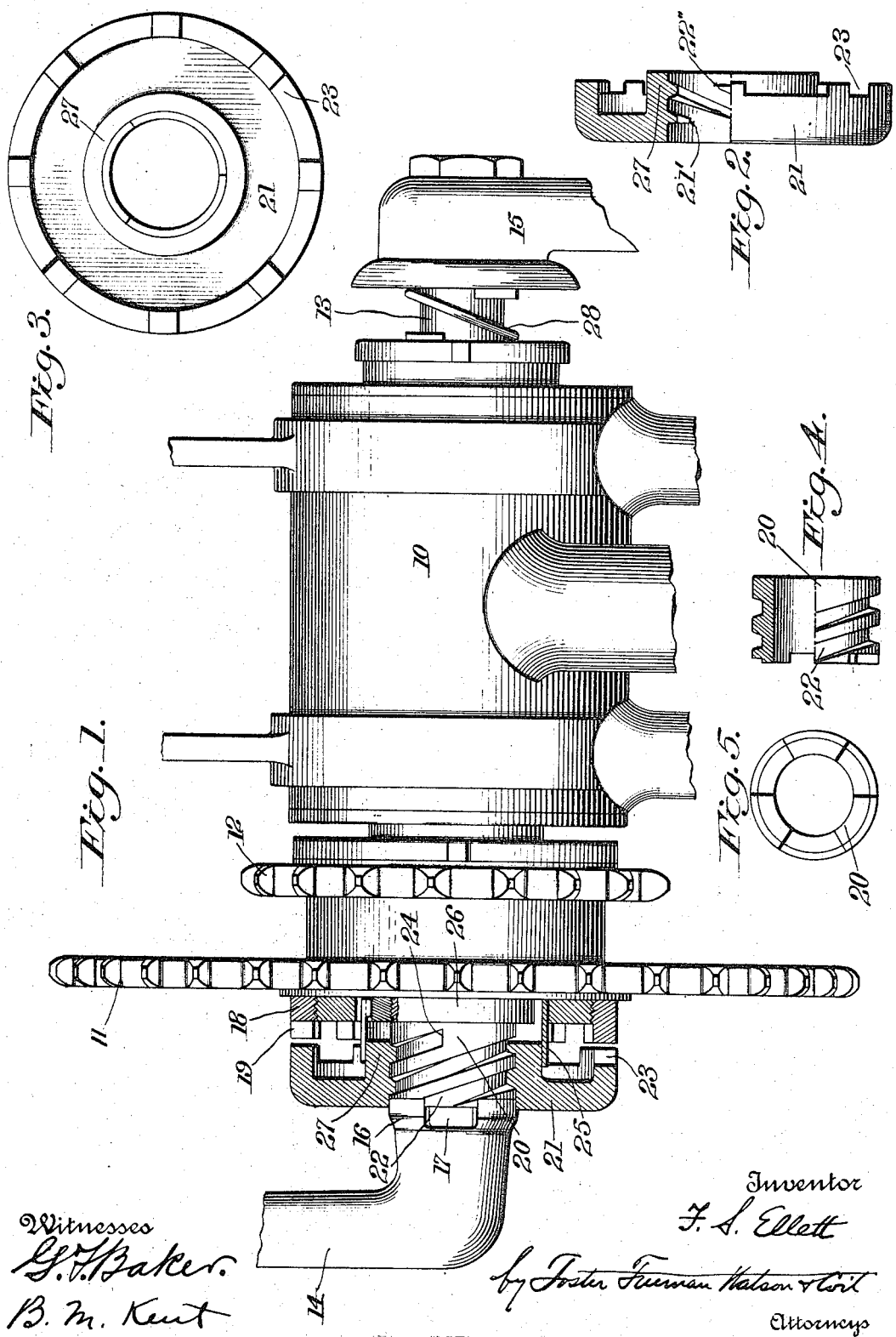

UNITED STATES PATENT OFFICE.

FREDERICK S. ELLETT, OF ELMIRA, NEW YORK.

ENGINE-STARTING DEVICE FOR MOTOR-CYCLES.

1,141,787.  Specification of Letters Patent.  Patented June 1, 1915.

Application filed April 27, 1914. Serial No. 834,766.

*To all whom it may concern:*

Be it known that I, FREDERICK S. ELLETT, a citizen of the United States, and resident of Elmira, county of Chemung, State of New York, have invented certain new and useful Improvements in Engine-Starting Devices for Motor-Cycles, of which the following is a specification.

This invention relates to motorcycles and more particularly to improvements in engine starting devices therefor.

One of the objects of the invention is to provide a simple device for this purpose which is applicable to the standard makes of motorcycles without material changes therein.

Another object is to provide an engine starting device including a traveling nut, the parts being so constructed that there is no possibility of the nut becoming wedged.

Other objects and the features of novelty will be apparent from the following description taken in connection with the accompanying drawings, in which, Figure 1 is an elevation of a part of a motorcycle frame and the usual counter shaft wheels, certain parts being shown in section; Fig. 2 is a composite view, partly in elevation and partly in section of the traveling nut; Fig. 3 is an end elevation of the nut; Fig. 4 is a composite view, partly in section and partly in elevation, of a threaded sleeve for the pedal shaft; Fig. 5 is an end elevation of the same.

Referring to the drawings 10 indicates a portion of the motorcycle frame which acts as a supporting member for the sprocket wheels 11 and 12, these wheels being rotatably mounted on the frame. A shaft 13 is journaled in the supporting member 10 and is coaxially arranged with respect to wheels 11 and 12, this shaft having thereon the crank arms 14 and 15 to which the usual pedals are attached.

The shaft 13 is provided at one end with a shoulder 16 having a plurality of axially extending slots 17 therein. In the drawings I have indicated a construction in which there are three such slots. A threaded ring 18 is secured to the sprocket 11 and is provided with a series of rectangular axially projecting clutch jaws 19.

Between the sprocket 11 and the shoulder 16 is arranged a triple threaded sleeve 20 on which is arranged a nut 21. The sleeve 20 has axial projections 22 which engage the slots 17 and it will be observed that the thread spaces on the sleeve register with the axially extending sides of the slots 17 so that the ends 21' of the internal threads of the nut 21 will abut these sides when the nut is at the limiting position toward the left and thereby prevent the nut from wedging against the shoulder 16.

The nut 21 is provided with axially extending rectangular clutch jaws 23 which are adapted to coöperated with the jaws 19 to form a driving connection between the nut 21 and the sprocket 11.

In order to limit the movement of the nut 21 toward the right, on the sleeve 20, and thereby prevent thrust in an axial direction between the nut and the threaded ring 18, the thread spaces on the sleeve do not extend to the right end of the sleeve, being stopped as at 24 so that the ends 22'' of the internal threads on the nut 21 will engage the ends 24 of the thread spaces. This construction prevents any wedging of the nut 21 when it is moved toward the right to effect an engagement of the teeth 19 and 23. A retarding device 25 in the form of a spring is connected at one end to the ring 26 and extends around and in contact with the hub portion 27 of the nut 21.

In order to permit the nut 21 to turn on the sleeve 20 when the adjacent ends of the jaws 19 and 23 engage, the shaft 13 is arranged to be axially movable. A spring 28 surrounds the shaft 13 and normally presses the shaft toward the right in Fig. 1 and when the jaws 19 and 23 are in endwise engagement the turning of the sleeve 20 in the nut 21 draws the shaft 13 toward the left and compresses the spring 28. When the ends of the internal threads of the nut 21 engage the ends 24 of the thread of the thread spaces on the sleeve 20 the nut 21 will be positively turned with the shaft 13 and bring the jaws 19 and 23 into register with the opposing spaces and the spring 28 will then move the shaft 13 toward the right and effect a driving connection between the jaws 19 and 23.

The engine of the motorcycle is usually geared to the sprocket 11 by means of a suitable chain and therefore the engine may be started by rotating the sprocket 11. If, with the parts stationary, the shaft 13 is given right-hand rotation, as seen from the right hand end of Fig. 1, the nut 21 will be carried toward the right on the sleeve 20 on account of being held by the retarding ring 25. When the ends of the jaws 19 and 23 engage, the shaft 13 will be moved endwise, as above described, until the ends 24 of the thread spaces of the sleeve engage the ends of the thread in the nut, when the nut will be caused to rotate with the shaft 13 until the jaws 19 and 23 slip out of end engagement. The spring 28 will then move the shaft 13 toward the right and effect a lateral engagement of the jaws 19 and 23, so that further rotation of the shaft 13 will carry the sprocket 11 with it and thus rotate the engine shaft. After the engine starts and when the sprocket 11 attains a speed greater than that at which the shaft 13 is being rotated, the nut 21 will be carried toward the left on the sleeve 20 and thus disengage the jaws 19 and 23, thereby permitting the engine to run independently of the shaft 13.

It will be understood that changes may be made in the details of construction and that the form of the invention shown is merely illustrative of the principles of my invention, the invention being defined in the appended claims.

Having described my invention what I claim and desire to secure by Letters-Patent is, 1. In a device of the class described, the combination of a supporting member, a wheel rotatable thereon, a rotatable shaft having a screw thereon, a nut on said screw having clutch teeth, coöperating teeth carried by said wheel, retarding means for said nut permitting said screw to be rotated relative to the nut, and means limiting the relative movement of said screw and nut so as to prevent thrust between said wheel and nut in an axial direction when said teeth are in driving engagement.

2. In a device of the class described, the combination of a supporting member, a wheel rotatable thereon, a rotatable shaft coaxial with said wheel and having a screw thereon, a nut on said screw having clutch teeth, means for holding said nut to permit said screw to be rotated relatively thereto, coöperating teeth carried by said wheel adapted to engage with the teeth on said nut when the nut moves in an axial direction, said screw and said nut having coöperating parts adapted to limit the axial movement of the nut so as to prevent thrust between said wheel and nut in an axial direction when said teeth are in driving engagement.

3. In a device of the class described, the combination of a supporting member, a wheel rotatable thereon, a rotatable shaft coaxial with said wheel and having a screw thereon, a nut on said screw having clutch teeth, means for holding said nut to permit said screw to be rotated relatively thereto, coöperating teeth carried by said wheel adapted to engage with the teeth on said nut when the nut is moved in an axial direction, said screw and said nut having their interengaging threads so formed as to limit the relative movement of the screw and nut and prevent thrust in an axial direction between said nut and said wheel.

4. In a device of the class described, the combination of a supporting member, a wheel rotatable thereon and provided with a series of substantially rectangular teeth, a rotatable and axially movable shaft coaxial with said wheel and having a screw thereon, a nut on said screw having teeth adapted to engage with the teeth on said wheel, retarding means for holding said nut to permit said screw to be rotated relatively thereto, spring means adapted to move said shaft in one direction axially to effect the interengagement of said teeth, said spring means being also adapted to permit said shaft to move axially in the opposite direction, whereby said nut may continue to turn on said screw when said teeth are in endwise engagement, and means whereby said nut is rotated relatively to said wheel.

5. In a device of the class described, the combination of a supporting member, a wheel rotatable thereon and provided with a series of clutch teeth, a rotatable axially movable shaft coaxial with said wheel and having a screw thereon, a nut on said screw having teeth adapted to engage with the teeth on said wheel, retarding means for holding said nut to permit said screw to be rotated relatively thereto, spring means pressing said shaft in one direction and adapted to permit the shaft to move axially in the opposite direction whereby said nut may continue to turn on said screw when said teeth are in endwise engagement, and means whereby said nut is rotated relatively to said wheel.

6. In a device of the class described, the combination of a supporting member, a rotatable shaft, carried thereby, having a slotted shoulder, a threaded sleeve on said shaft and having projections engaging the slots in said shoulder, the thread spaces on said sleeve registering with axially extending sides of said slots, as and for the purpose described.

7. In a device of the class described, the combination of a supporting member, a rotatable shaft, carried thereby, having a shoulder provided with three axially extending slots, a triple-threaded sleeve on said shaft having axial projections engaging said slots, the thread spaces on said sleeve registering with axially extending sides of said slots, as and for the purpose described.

In testimony whereof I affix my signature in presence of two witnesses.

FREDERICK S. ELLETT.

Witnesses:
 ELMER A. BRACE,
 THEO. C. SAYLES.